(No Model.)

J. M. NICHOLSON.
PLOW.

No. 469,168.  Patented Feb. 16, 1892.

Witnesses:  Inventor
E. S. Duvall, Jr.  John M. Nicholson.
W. S. Duvall.  By his Attorneys,
C. A. Snow & Co.

UNITED STATES PATENT OFFICE.

JOHN MILTON NICHOLSON, OF DECKERVILLE, MICHIGAN.

PLOW.

SPECIFICATION forming part of Letters Patent No. 469,168, dated February 16, 1892.

Application filed September 4, 1891. Serial No. 404,765. (No model.)

*To all whom it may concern:*

Be it known that I, JOHN MILTON NICHOLSON, a citizen of the United States, residing at Deckerville, in the county of Sanilac and State of Michigan, have invented a new and useful Plow, of which the following is a specification.

This invention relates to improvements in plows; and the objects in view are to provide a means for conveniently raising and lowering the plow-beam with relation to its supporting-wheel.

Though herein described and shown in connection with a plow, it will be obvious from the following description that the invention may be applied with success to various other kinds of agricultural machinery.

With the above-stated objects in view the invention consists in certain features of construction hereinafter specified, and particularly pointed out in the claim.

Figure 1:
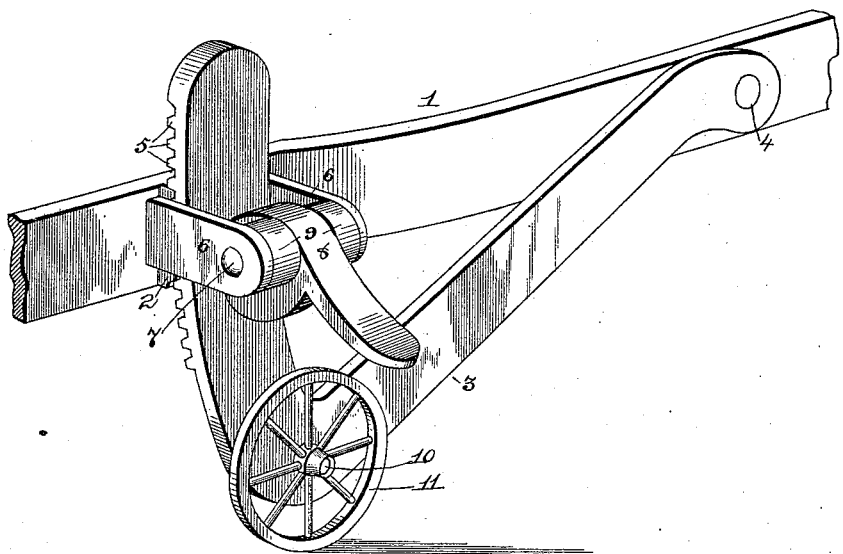
Figure 2:
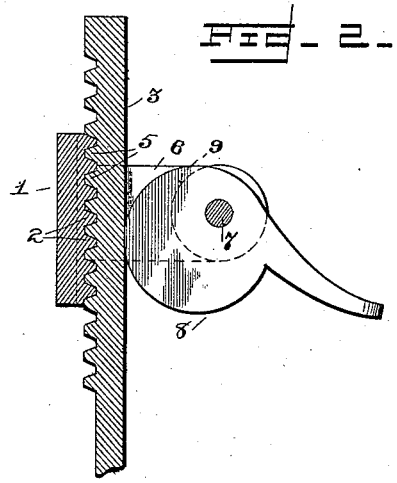

Referring to the drawings, Figure 1 is a perspective of a portion of a plow-beam provided with my improvement. Fig. 2 is a vertical transverse section through the beam and eccentric.

Like numerals of reference indicate like parts in all the figures of the drawings.

1 designates a plow beam or stock, and the same may be of any suitable formation or construction and of either wood or metal, but preferably of the latter, and upon the face thereof at a suitable point there is cast or otherwise formed a vertical series of teeth or cogs 2. Of course it will be obvious that in instances where wooden beams or stocks have my invention applied said cogs will be formed upon a plate and bolted thereto.

3 designates a substantially-L-shaped bracket-arm, and the same is bolted pivotally, as at 4, to the face of the beam and has formed upon its inner face and at its free end a series of cogs or teeth 5, adapted to mesh or engage with the cogs or teeth 2 of the beam.

At the sides of the cogs 2 of the beam there are located and outwardly extend from the beam a pair of perforated ears 6, through the perforations of which a transverse bolt 7 is passed and has mounted pivotally thereon an eccentric binding-lever 8, which when elevated is out of contact with the bracket-arm and when lowered serves to clamp the teeth of the arm into engagement with the teeth or cogs 2. This eccentric-lever is centered between the perforated ears by a pair of washers located at opposite sides of the lever and between the ears and lever and indicated by the numeral 9. The lower end of the bracket-arm is provided with a stub-axle 10, and upon the same a wheel 11 is journaled.

From the foregoing description it will be seen that by elevating the eccentric-lever the bracket-arm may be disengaged from the cog-teeth 2 and the beam raised or lowered a desired distance from the ground and locked at any point of its adjustment by a simple lowering of said lever.

It will be apparent that I have thus provided a cheap simple device by which the various styles of agricultural machines may have their frames raised and lowered, and that I obviate thereby the necessity of employing nuts and bolts for this purpose, and consequently necessitating the application of wrenches for separating the same.

Having described my invention, what I claim is—

The combination, with the plow-beam having the series of cog-teeth upon one of its side faces, of perforated ears located at opposite sides of the teeth, a bolt passed therethrough, an eccentric-lever mounted on the bolt, and the L-shaped wheel-carrying bracket pivoted to the beam and having its free end upwardly disposed and passed between the beam and lever and its inner face provided with cog-teeth for engaging the teeth of the beam, substantially as specified.

In testimony that I claim the foregoing as my own I have hereto affixed my signature in the presence of two witnesses.

JOHN MILTON NICHOLSON.

Witnesses:
JOHN LEITCH,
BENJAMIN F. WILLIS.